(12) United States Patent
Eswara et al.

(10) Patent No.: US 6,219,554 B1
(45) Date of Patent: Apr. 17, 2001

(54) SYSTEM AND METHOD OF INTEGRATING DYNAMIC FREQUENCY ASSOCIATION WITH CHANNEL BORROWING TECHNIQUES

(75) Inventors: Srinivas Eswara, Carrolton; Daniel Thomas Carter, Plano; Michael John McCarthy, University Park, all of TX (US); Shalini Periyalwar, Ottawa (CA); James Eric Wilson, Richardson, TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/148,378

(22) Filed: Sep. 4, 1998

(51) Int. Cl.[7] .............................. H04Q 7/20; H04B 15/00; H04B 1/00
(52) U.S. Cl. ........................... 455/452; 455/444; 455/62; 455/63
(58) Field of Search .................................. 455/452, 444, 455/62, 63, 453, 454, 524, 513

(56) References Cited

U.S. PATENT DOCUMENTS

| | | | |
|---|---|---|---|
| 5,483,666 | * | 1/1996 | Yamada et al. ................... 455/33.1 |
| 5,491,837 | | 2/1996 | Haartsen . |
| 5,497,505 | | 3/1996 | Koohgoli et al. . |
| 5,507,008 | | 4/1996 | Kanai et al. . |
| 5,574,974 | | 11/1996 | Almgren et al. . |
| 5,586,170 | | 12/1996 | Lea . |
| 5,956,644 | * | 9/1999 | Miller et al. ........................ 455/453 |
| 6,047,187 | * | 4/2000 | Haartsen ............................. 455/450 |

OTHER PUBLICATIONS

IEEE Journal on Selected Areas in Communications, vol. 7, No. 8, Oct. 1989, *Performance Analysis of Cellular Mobile Communication Systems with Dynamic Channel Assignment*, David Everitt and David Manfield, pp. 1172–1180.

IEICE Transactions, vol. E 74, No. 6, Jun. 1991, *Channel Segregation, a Distributed Adaptive Channel Allocation Scheme for Mobile Communication Systems*, Yukitsuna Furuya and Yoshihiko Akaiwa, pp. 1531–1537.

Kyushu Institute of Technology, *The Channel Segregation, a Self–Organized Dynamic Channel Allocation Method: Application to TDMA/FDMA Microcellular System*, Yoshihoko Akaiwa and Hidehiro Andoh, pp. 345–349.

Mobile Communications Technology Development Co., Ltd., *Distributed Adaptive Channel Allocation Scheme with Variable C/I Threshold in Cellular Systems*, Kojiro Hamabe, Tetsuro Ueda and Toshio Otsu, pp. 164–167.

Ericsson Radio Systems AB, *Radio Resource Allocation in AMPS/TACS System Based on Uplink Observations*, Magnus Almgren, Magnus Frodigh, Kenneth Wallstedt, pp. 599–603.

* cited by examiner

*Primary Examiner*—Edward F. Urban
*Assistant Examiner*—Sheila Smith
(74) *Attorney, Agent, or Firm*—Haynes and Boone, LLP

(57) ABSTRACT

A Dynamic Frequency Association ("DFA") techniques comprising fixed channel allocation ("FCA") and distributed channel borrowing techniques using a segregation scheme is described. The DFA technique can be used autonomously to dynamically determine the best channels for a cell cluster. Additionally, a method of minimizing search delays at channel assignment by employing a channel usage history is disclosed. In one aspect, as in FCA, each cell is assigned its nominal channels, if any, from the available frequency spectrum, with a fixed radio assigned to each of these frequencies, respectively. Additionally, in accordance with the teachings of the present invention, each cell is equipped with one or more radios designated as "DFA radios". In operation, idle DFA radios scan channels that may be borrowed in order to build a probability matrix. This enables the cell to determine which channels to use for traffic prior to actual channel request by a mobile. This reduces the search delay experienced in classic segregation schemes.

35 Claims, 4 Drawing Sheets

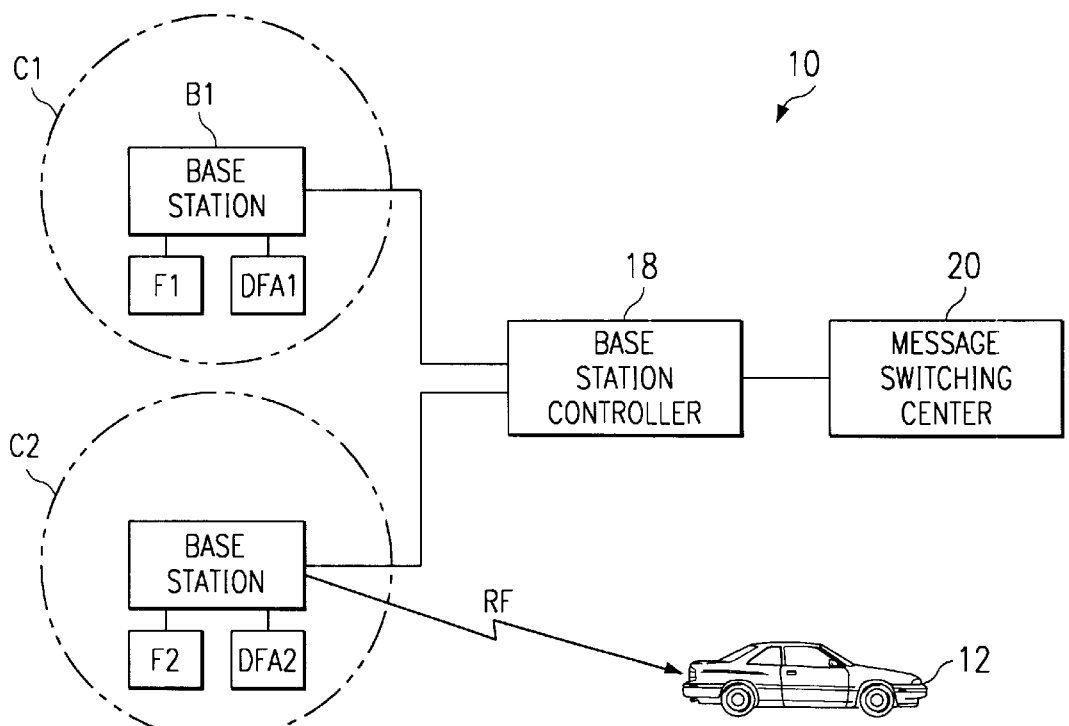
Fig. 1
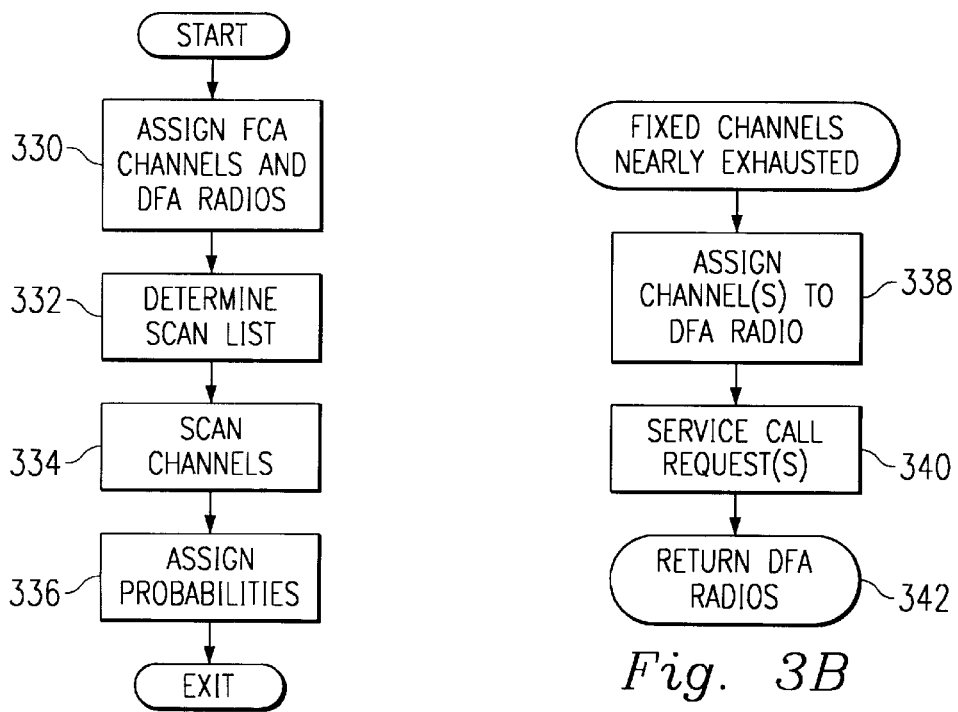
Fig. 3A
Fig. 3B

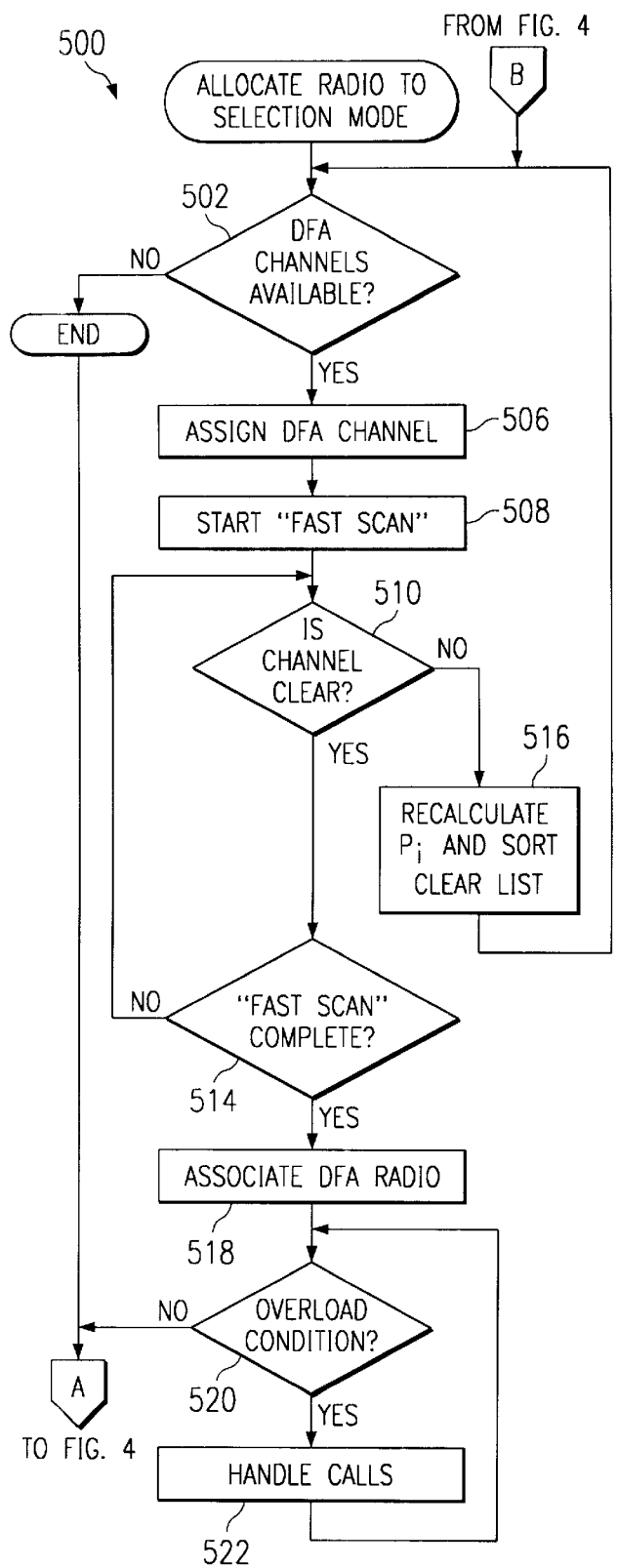
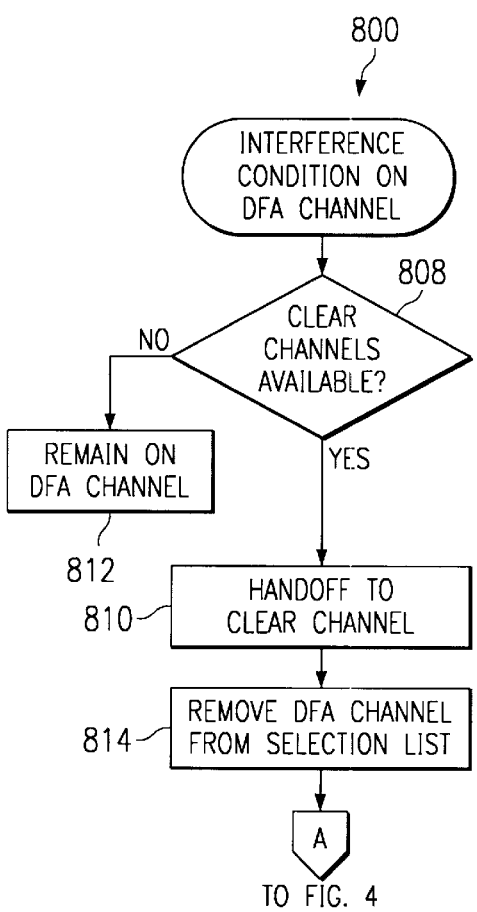
Fig. 5
Fig. 6

SYSTEM AND METHOD OF INTEGRATING DYNAMIC FREQUENCY ASSOCIATION WITH CHANNEL BORROWING TECHNIQUES

TECHNICAL FIELD

The invention relates generally to cellular networks and, more particularly, to a system and method of allocating radio frequency channels in a cellular network environment.

BACKGROUND OF THE INVENTION

Currently, cellular radio frequency ("RF") plans generally assign radio channels, or frequencies, to cells within an RF network based on forecasts and ongoing studies of traffic patterns. Unfortunately, this scheme, referred to as "Fixed Channel Allocation" or "FCA", does not take into account the dynamic nature of traffic in certain portions of a coverage area. For example, in a high-density business corridor, the channel requirements in a subcell A during a given time period may be higher than the capacity of subcell A and the result in call blockage. At the same time, a neighboring subcell B may have idle channels due to less-than-capacity call rates.

One solution to this problem is to increase the number of channels assigned to subcell A to handle the higher call volumes at the expense of other cells and possibly violating existing reuse patterns. However, this does not account for the mobile nature of traffic, because at another period in time, subcell B may be experiencing call blockage, while channels in subcell A remain idle.

Another problem with FCA is that cell sites are shrinking as demand for capacity increases. Due to both irregularities in propagation and traffic distribution in these small cells, pre-assignment of channels becomes difficult.

Implementation of a centralized intelligence to monitor channel usage in various cells and assigning channels based on need is not practical, due to the large amount of overhead processing and messaging necessary to keep both the centralized intelligence and the individual cells apprised of channel usage. Additionally, inter-mobile telephone exchange ("MTX") messaging would involve changes to IS-41 messaging.

A number of papers have been published describing a scheme known as "Adaptive Channel Allocation" or "ACA". Most of these proposals deal with "Dynamic Channel Assignment" ("DCA"), which comprises the ability to dynamically allocate the entire spectrum based on need, without any frequency scanning per cell.

Other relevant channel assignment schemes include "Hybrid Channel Assignment" ("HCA") and "Borrowing Channel Assignment" ("BCA"). In HCA, a combination of FCA and DCA, a portion of the total frequency channels uses FCA and the rest use DCA. In BCA, when all the fixed channels of a cell ("acceptor cell") are occupied, the acceptor cell borrows free channels from a neighboring cell (donor cell). In generally, BCAs use some form of central control to lock out other cells from using the channel(s) borrowed by the acceptor cell. While BCA is effective under light to moderate traffic conditions, especially when compared to FCA, under heavy traffic, channel borrowing may be high enough to cause channel usage efficiency to drop drastically and increase blocking probability due to channel locking.

Segregation is described in the literature as a self-organizing dynamic channel allocation scheme. Channels are assigned probabilities of being clear based upon successful use of that channel for a call. When a call arrives at a cell, the determination of which channel to use to service the call is based on the current probabilities of the channels. Carriers sense (using received signal strength measurement) is performed on the selected channel (i.e., the channel with the highest probability) to ensure that it is clear to use. If not, the probability of that channel is decreased and the next channel is tried. If that channel is clear, the call is assigned to that channel and its probability is increased.

While segregation offers certain advantages over previously-described methods, it, too, suffers from certain deficiencies, including the fact that the time for convergence to optimal allocation is very long. In addition, the determination of carrier sense only at channel request is shown to cause extensive delay and if delay is limited to a finite wait time, performance of the system degrades rapidly.

Therefore, what is needed is an improved system and method of allocating radio frequency channels in a cellular network environment which take advantage of the best qualities of FCA and distributed channel borrowing utilizing a segregation scheme.

SUMMARY OF THE INVENTION

One embodiment of the invention, accordingly, is a Dynamic Frequency Association ("DFA") technique comprising FCA and distributed channel borrowing techniques using a segregation scheme. The DFA technique described herein can be used autonomously to dynamically determine the best channels for a cell cluster. Additionally, a novel method of minimizing search delays at channel assignment by employing a channel usage history is disclosed.

In one aspect, as in FCA, each cell is assigned its nominal channels, if any, from the available frequency spectrum, with a fixed radio assigned to each of these frequencies, respectively. Additionally, in accordance with the teachings of the present invention, each cell is equipped with one or more radios designated as "DFA radios". In operation, idle DFA radios scan channels that may be borrowed in order to build a probability matrix. This enables the cell to determine which channels to use for traffic prior to actual channel request by a mobile. This reduces the search delay experienced in classic segregation schemes.

The algorithm for implementing the DFA techniques of the present invention operates as follows. During low traffic periods, as previously indicated, FCA channels and DFA radios are assigned. Next, a scan list is determined to identify the channels that can potentially be used by a DFA radio in a subcell during its traffic peaks. The identified channels are placed in a scan list. Next, each individual cell uses its DFA radio(s) and Mobile Assisted Channel Allocation (IS-136 MACA) to cyclically scan each channel that may be borrowed to obtain reverse and forward RF information to determine whether the channel is clear. This functionality, referred to as "Scanning Mode", is performed while fixed radios, and possibly other DFA radios, serve offered traffic.

Probabilities of being clear are then assigned to channels, with weight given to consecutive clear scans. A scan is determined to be clear if the RF signal strength of the channel does not exceed a predefine threshold, which is determined by the network in question. The channels are arranged in an updated, ordered "clear list."

Before an overload condition occurs in which an acceptor cell exhausts all its available channels to service calls, that cell will attempt to borrow channels designated in the ordered clear list, using the DFA radios that were used to construct the ordered clear list. Only those channels whose probability is higher than a predefined minimum threshold may be selected for use. A DFA radio of the acceptor cell is then associated with, or tuned to, the selected channel, at which point the DFA radio is said to be in "Selection Mode." Received signal strength on the channel is continuously monitored to ensure that it is below a predefined threshold. Because of the behavior of the DFA radio during the low traffic periods, the delay in performing this step is substantially decreased, expediting call service at the highest traffic periods.

New calls or handoffs may now be serviced by both fixed radios, as well as DFA radios that are in Selection Mode. If interference is detected on the borrowed channel, the DFA radio is returned to the Scanning Mode. However, if the DFA radio is still needed to service calls, it determines another channel that is free of interference, as described above, and returns to Selection Mode. The donor cell (i.e., the cell from which a channel is borrowed) detects the usage of one of its nominal channels by an acceptor cell is close enough, and uses that channel only as a last resort. This eliminates the central control problem of channel locking by allowing that channel to be used if necessary in the donor cell. Finally, if the cell exits the overload condition, the DFA radio is returned to Scanning Mode, whereupon the probabilities of being clear for all the frequencies in the scan list are updated.

A technical advantage achieved with the invention is that, in a reuse cluster with non-uniform traffic distribution, both spatial and temporal, substantial gains in RF efficiency will be seen without the necessity of a central management entity for controlling channel usage.

Another technical advantage achieved with the present invention is that search delays are minimized by employment of a channel usage history.

Yet another technical advantage achieved with the present invention is that, because donor cells are free to use channels that have been borrowed by an acceptor cell, if necessary, channel locking, which is common in networks employing channel borrowing schemes, does not occur.

BRIEF DESCRIPTION OF THE DRAWINGS

FIG. 1 is a system block diagram of a cellular RF network embodying features of the present invention.

FIGS. 3A and 3B are flowcharts illustrating the operation of the present invention during periods of low and high traffic, respectively.

FIG. 5 is a flowchart illustrating a channel selection algorithm of the present invention.

FIG. 6 is a flowchart illustrating an algorithm of the present invention for channel selection on interference during a call.

DESCRIPTION OF THE PREFERRED EMBODIMENT

Figure 2:
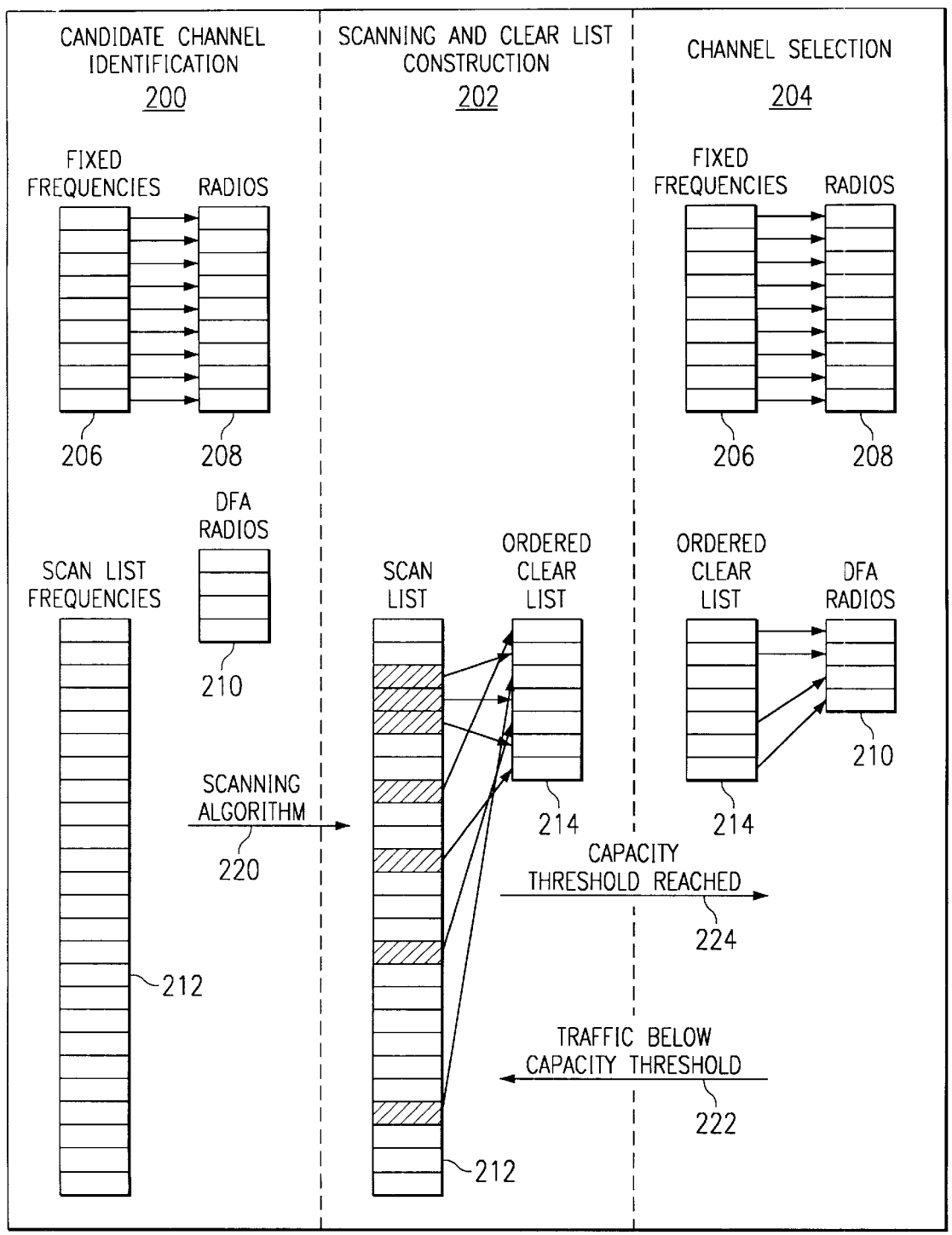
FIG. 2 is a high level functional block diagram illustrating the operation of the present invention.

In FIG. 1, a cellular RF network embodying features of the present invention is designated generally by a reference numeral 10. In a preferred embodiment, the network 10 comprises a plurality of cells, represented in FIG. 1 by cells C1 and C2, each of which may be subdivided into a plurality of sectors or "subcells" (not shown). Each cell C1, C2, comprises a base station B1, B2, respectively, the primary function of which is to provide over-the-air radio frequency ("RF") communication with mobile units, such as a mobile unit 12. In accordance with features of the present invention, each base station B1, B2, includes one or more radios, which may be either fixed frequency, represented in FIG. 1 by fixed radios F1 and F2, or DFA, represented in FIG. 1 by DFA radios DFA1 and DFA2. Although as shown in FIG. 1, each base station B1, B2, includes a single fixed radio (F1, F2) and a single DFA radio (DFA1, DFA2), it should be noted that a base station may include any number of either type of radio, so long as it includes a minimum of one DFA radio, for reasons that will become apparent.

The base stations B1, B2, are further connected via a link to a base station controller ("BSC") 18, which is connected to a mobile switching center ("MSC") 20. As the individual components of the network 10 are well known in the art, the details thereof will not be further described, except as necessary to impart a complete understanding of the present invention.

DFA radios may be tuned to a specified frequency such that, using the DFA technology of the present invention, frequencies that are unused or belong to other cells ("donor cells") can be borrowed by another cell ("acceptor cell") to provide the acceptor cell with additional capacity. As illustrated in FIG. 2, DFA performs three basic steps: (1) identification of candidate channels for use by DFA radios, illustrated in FIG. 2 by a section designated by a reference numeral 200; (2) determination of probability of being clear for candidate channels, illustrated in FIG. 2 by a section designated by a reference numeral 202; and (3) selection and assignment of channels for Cell Processing, illustrated in FIG. 2 by a section designated by a reference numeral 204. Each of these steps will be discussed in detail below.

Referring to section 200, and as will be described in greater detail below, each of a cell's nominal frequencies 206 is assigned to one of its fixed radios 208, such as the fixed radios F1, F2 (FIG. 1). At this point, the cell's DFA radios 210, such as the DFA radios DFA1, DFA2, are unassociated. As will also be described in greater detail below, candidate channel identification 200 is performed to identify the channels that can potentially be used by a DFA radio in a subcell during its traffic peaks. The selected channels are placed in a scan list 212. In its simplest form, the scan list 212 includes all of the channels used within the network 10 other than the nominal channels 206 to which the fixed radios of the cell are assigned. Alternatively, certain channels may be removed from the scan list 212 to reduce interference within the network. It is also possible for the network to dynamically determine the scan list 212.

For example, in one embodiment, the following specific sets of frequencies are automatically removed from the scan list 212 to reduce the amount of interference experienced by the network 10:

1. All existing fixed frequencies within the cell, including both voice channels ("VCHs") and control channels ("CCHs"), are removed. If the cell is sectored, this includes the fixed frequencies within other partitions of the cell.

2. In order to minimize the interference to all CCHs in the cell, both analog CCHs ("ACCHs") and digital CCHs ("DCCHs"), the adjacencies of the CCH frequencies, are removed. This includes the two frequencies before and the two frequencies after the fixed frequency. For example, for existing fixed frequency N in sector X, the following frequencies are removed: N−2, N−1, N+1, and N+2.

3. All adjacencies of the existing fixed VCH frequencies within the subcell are removed. This includes the two frequencies before and the two frequencies after the fixed frequency. For example, for the existing fixed frequency N in sector X, the following frequencies are removed: N−2, N−1, N+1, and N+2.

4. All adjacencies of the existing fixed VCH frequencies within the other partitions of the cell are removed. This includes the frequency before and the frequency after the fixed frequency. For example, in sector X for the existing fixed frequency Q in sector Y and the existing fixed frequency R in sector Z, the following frequencies are removed: Q−1, Q, Q+1, R−1, R, and R+1.

Construction of the scan list 212 and an ordered clear list 214 will now be generally described with reference to section 202.

Scanning Mode involves tuning one of the DFA radios 210 to a frequency on the scan list 212. The DFA radio monitors that frequency, taking various measurements, e.g., reverse RSSI measurements, to determine whether the frequency is clear. When either the DFA radio remains clear for a specified scan interval (pass case) or interference on the frequency exceeds a predetermined minimum threshold (fail case), the DFA radio stops scanning the frequency, updates its probability, and tunes to the next frequency in the scan list 212. All frequencies on the scan list 212 are monitored in an iterative fashion, with the exceptions noted below.

The above-described functionality is referred to as a "slow scan." A "fast scan" is also utilized to ensure that a call is not setup on a noisy channel, as described in greater detail below in connection with the description of allocation of DFA radios to Selection Mode.

The purpose of the scan interval is to ensure that if a channel is used in a neighboring cell, that use is detected on that frequency in the cell using DFA. By scanning the frequency for an appropriate amount of time, the DFA radio will detect noise from the neighboring cell. Therefore, the scan time must be at least as long as it takes for a given channel to be selected in a neighboring cell for Call Processing.

In order to detect noise on frequencies of neighboring cells, the longest scan interval of all the neighboring cells must be used. This interval depends upon the incoming call rate, in terms of average time differences between new calls and average call duration in that cell as shown by the formula below. These equations correspond to a cell using the "Most Idle" ("MIDL") channel selection algorithm. The mean holding time refers to the time that a cell is resident on a single channel in a single cell, not the holding time of a complete call that includes handoffs.

incoming call rate=(mean holding time)/(number of busy radios)

scan interval=(number of channels in the cell)*(incoming call rate)

An algorithm is used to assign a probability of being clear to each frequency being scanned. $P_i$ is the probability at scan i. The probability is calculated as follows:

$P_0$ for all channels is initially set to 0

$P_i$ is a real number between 0 and 100

If a scan result is successful (e.g., reverse RSSI<the predetermined maximum threshold), the probability is calculated as a weighted probability based on the number of repeated successes. This provides more weight to more accurately report the channels current conditions. In particular, if the scan result is successful, the probability is calculated as follows:

$$P_i = P_{i-1} * \left(\frac{N_i}{N_i + 1}\right)^x + \left(1 - \left(\frac{N_i}{N_i + 1}\right)^x\right) \qquad (1)$$

If a scan result is unsuccessful (e.g., reverse RSSI>the predetermined maximum threshold), the probability is calculated to take the failure into account. When a failure occurs, the weight associated with any previous successes is eliminated and must be accumulated as new repeated successes come in. In particular, if the scan result is unsuccessful, the probability is calculated as follows:

$$P_i = P_{i-1} * \left(\frac{N_i}{N_i + 1}\right) \qquad (2)$$

In each of equations 1 and 2 above, $N_i$ represents the scan iteration, the maximum value of which is 12, and the value of x is increased as appropriate. In particular, the value of x is initially set to 1; upon the first pass without a failure, x is incremented to 2; upon two consecutive passes without a failure, x is increased to its maximum value of 4. Upon any failure, x is reset to 1.

The above algorithm was selected because it produces an acceptable rate of change of the probability in both successful and unsuccessful cases.

The scan cycle time is the time required to scan all of the frequencies in the scan list 212. The scan cycle time is reduced in three ways:

1. when a channel "fails", the monitoring of the current channel is halted, and the radio starts scanning the next channel on the scan list 212:
2. the scanning workload is distributed among all the DFA radios of a cell available to perform scanning; and
3. any channel whose probability of being clear is less than a predetermined minimum threshold is scanned one out of every six cycles to avoid wasting time on a channel that is known to be bad but still scanning enough for the channel to adaptively update if the RF environment changes.

FIGS. 3A and 3B are flowcharts of the operation of the DFA radios during low traffic periods (Scanning Mode) and high traffic periods (Selection Mode), respectively. In step 330, each cell is assigned its nominal channels, if any, from the available spectrum, with a fixed radio assigned to each of these frequencies. Additionally, each cell is equipped with one or more DFA radio(s). In step 332, a scan list 212 for the cell is determined, as described above. This step is performed to identify the channels that can potentially be used by a DFA radio in a cell during its traffic peaks. The identified channels are included in a scan list 212 for the cell. In step 334, individual cells use the DFA radio(s) and a standard known in the industry as IS-136 MACA to cyclically scan each channel that may be borrowed to determine whether the channel is clear. This functionality, referred to as Scanning Mode, is performed while the fixed radios, and possibly other DFA radios, of the cell serve offered traffic.

In step 336, a probability of being clear is assigned to each of the channels in the scan list 212, with weight given to consecutive clear scans. As explained above, a scan is determined to be clear if the RF signal strength does not exceed a predefined maximum threshold. The channels are arranged in an updated, ordered clear list 214.

Referring now to FIG. 3B, during high traffic conditions, before an overload condition occurs in which a cell ("acceptor cell") exhausts all the channels available to it to service calls, the acceptor cell attempts to borrow channels indicated in the clear list 214, using the DFA radios that are used to build the list. Only those frequencies the probabilities of which are higher than a predefined cutoff may be selected. In step 338, a DFA radio is associated with, or tuned to, the selected channel and is said to be in Selection Mode. Received signal strength on the channel is continuously monitored to ensure that it is below a predefined threshold. Because of the behavior of the DFA radio during low traffic periods, as described above with reference to FIG. 3A, the delay in performing this step is substantially decreased, expediting call service at the highest traffic periods. In step 340, new calls or handoffs may now be serviced by both the fixed and tuned DFA radios of the cell.

If interference is detected on a borrowed channel, the DFA radio is returned to Scanning Mode. However, if the DFA radio is still needed to service calls, it determines another channel that is free of noise and returns to Selection Mode. A cell from which a channel is borrowed ("donor cell") detects the usage of one of its nominal channels by an acceptor cell is close enough and uses that channel only as a last resort. This eliminates the central control problems of channel locking by allowing that channel to be used, if necessary, by the donor cell.

Finally, in step 342, if the cell exits the overload condition, the DFA radio(s) is returned to Scanning Mode, whereupon the probabilities of being clear for all the frequencies in the scan list 212 are updated.

Figure 4:
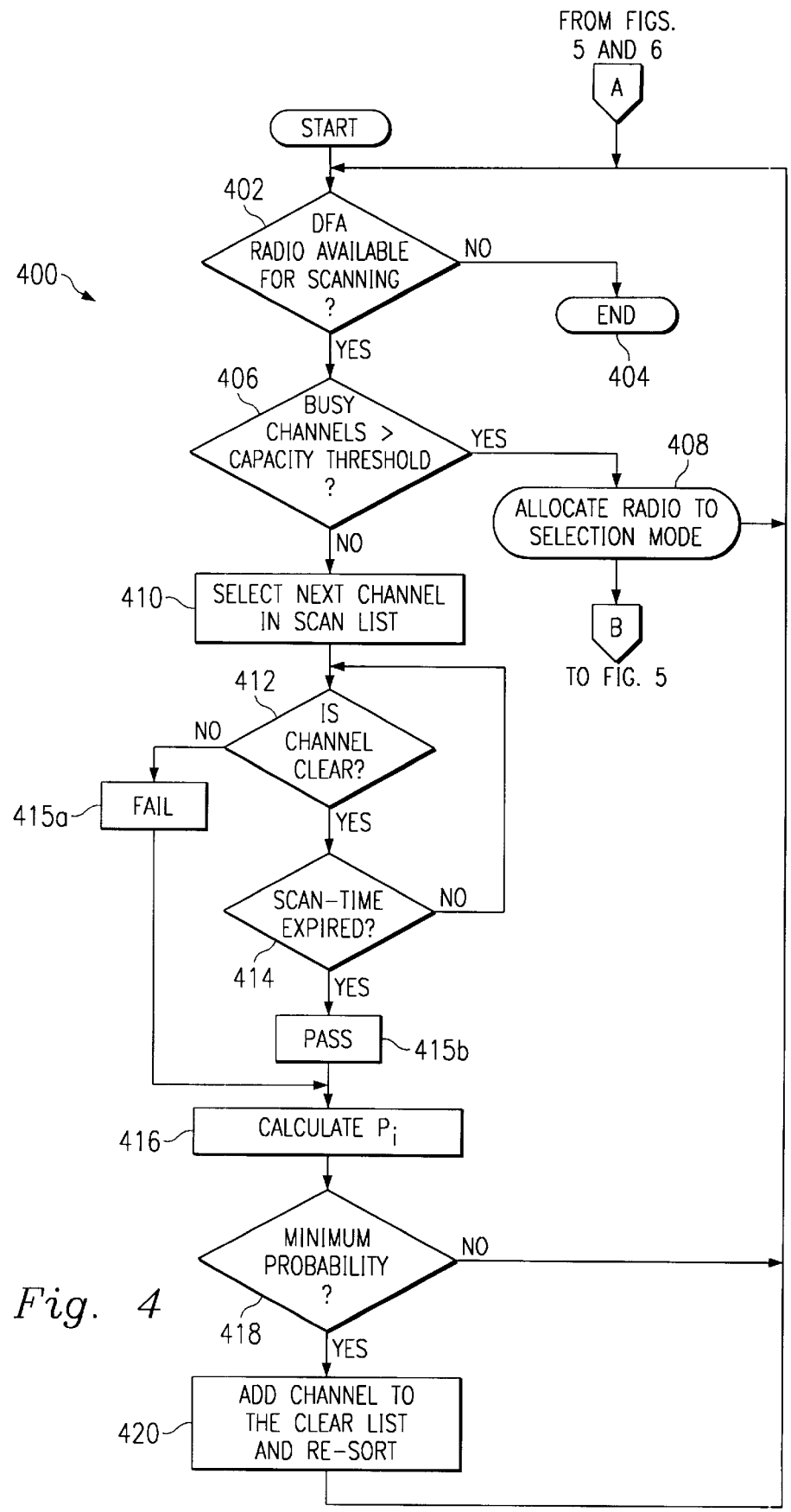
FIG. 4 is a flowchart illustrating a channel scanning algorithm of the present invention.

FIG. 4 is an illustration of a channel scanning algorithm 400, which is illustrated in FIG. 2 as an arrow 220 directed from the section 200 to the section 202. The algorithm 400 is an expansion of steps 334 and 336 of FIG. 3A. In step 402, a determination is made whether a DFA radio is available for scanning. If not, execution terminates in step 404; otherwise, execution proceeds to step 406. In step 406, a determination is made whether an overload condition has been reached; that is, whether the number of busy (i.e., non-idle) channels exceeds a predefined "capacity threshold." If so, execution proceeds to step 408, in which the DFA radio is allocated to Selection Mode and frequency association is attempted, as described in greater detail below with reference to FIG. 5 and then returns to step 402. The condition in which the number of busy channels exceeds the capacity threshold is represented in FIG. 2 by an arrow 222. If in step 406 it is determined that the number of busy channels does not exceed the Capacity Threshold, execution proceeds to step 410, in which the next channel in the scan list 212 is selected. The condition in which the number of busy channels does not exceed the capacity threshold is represented in FIG. 2 by an arrow 224. In step 412, a determination is made whether the selected channel is clear. If so, execution proceeds to step 414, in which a determination is made whether the scan time has expired; otherwise, a "fail" is indicated in step 415a and execution proceeds to step 416, in which $P_i$ for the channel is calculated.

Returning to step 414, if it is determined that the scan time has not expired, execution returns to step 412; otherwise, a "pass" is indicated in step 415b and execution proceeds to step 416. Upon completion of step 416, in step 418, a determination is made whether $P_i$ is greater than or equal a predetermined minimum probability. If not, execution returns immediately to step 402; otherwise, execution proceeds to step 420, in which the currently selected channel is added to the clear list 214 and the list is resorted, and then returns to step 402.

A method of constructing a clear list 214 will now be described. Any time the probability that a frequency on the scan list 212 is clear is greater than or equal to the predetermined minimum probability, represented in FIG. 2 by shading of the channel representing the frequency, the channel is added to the clear list 214, and the list is sorted by probability. The probability is chosen to ensure that only frequencies that have been interference-free for an extended period of time are used on DFA radios by Call Processing.

The allocation of DFA radios to Selection Mode, as illustrated in section 204, will now be described. When the overload condition is entered; that is, when the number of all idle channels available in the cell falls below the capacity threshold, the first DFA radio is allocated to Selection Mode and tuned to the top channel on the clear list 214. In one embodiment, the capacity threshold is defined as 85% of the available radios in a non-idle state. This allows the DFA radios ample time to tune before they will be needed to provide Call Processing support.

FIG. 5 illustrates a channel selection algorithm 500. In step 502, a determination is made whether there is a DFA channel available. If not, execution returns to step 402 of FIG. 4; otherwise, in step 506, a DFA channel is assigned. In step 508, a "fast scan," as explained below, is initiated. In step 510, a determination is made whether the channel is clear. If not, execution proceeds to step 516, in which $P_i$ is recalculated and the clear list 214 is sorted, and then returns to step 502; otherwise, execution proceeds to step 514, in which a determination is made whether the fast scan is complete.

Returning to step 514, if it is determined that the fast scan is complete, execution proceeds to step 518, in which a DFA radio is associated with, or tuned to, the frequency; otherwise, execution returns to step 510. Upon completion of step 518, execution proceeds to step 520, in which a determination is made whether an overload condition has been reached. If so, execution proceeds to step 522 in which calls are handled and returns to step 520. Otherwise, execution returns to step 402 (FIG. 4).

A fast scan is implemented to determine whether noise currently exists on the frequency this is to be used. This feature is described in greater detail below in connection with the discussion of Selection Mode below. This "fast scan" is performed every time a channel is assigned to a DFA radio.

The additional DFA radios continue in Scanning Mode until they are allocated to Selection Mode for Call Processing. As each additional DFA radio is added to Call Processing, a channel from the clear list 214 is assigned to the radio. The channels are assigned such that the idle channels with the highest probability of being clear are used first.

If interference is detected on a channel to which a DFA radio is assigned, a handover is attempted and handled as described below. A target channel is searched for with preference for fixed channels and, after the handover is attempted, the probability of the DFA channel that experienced the interference is recalculated as a fail case, and the radio is turned to the next possible clear channel following the channel spacing requirements.

FIG. 6 illustrates an algorithm 800 for penetrating channel selection when an interference condition exists on a DFA radio channel during a call. In step 808, a determination is made whether there is a clear channel, either fixed or DFA, available. If so, execution proceeds to step 810, in which a handoff to the clear channel is performed; otherwise, in step 812, the call continues to be serviced by the DFA radio on the noisy channel until a clear channel becomes available. Returning to step 810, after the call has been handed off to the clear channel, the DFA channel that experienced the interference is removed from the selection list and execution returns to step 402 (FIG. 4).

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

What is claimed is:

1. A method of allocating radio frequency ("RF") channels in an RF communication network including a cell during a low traffic period of said cell, said cell comprising at least one dynamic frequency association ("DFA") radio, the method comprising:

creating a scan list comprising a list of RF channels potentially available for use by said at least one DFA radio for servicing calls;

for each of said RF channels in said scan list, scanning said RF channel using said at least one DFA radio to determine whether said RF channel is clear;

for each of said RF channels in said scan list, calculating a probability of being clear for said RF channel based on current and previous scans of said RF channel;

constructing a clear list comprising an ordered list of each of said RF channels of said scan list determined to have at least a predetermined minimum probability of being clear, said clear list RF channels being arranged in order from a highest to a lowest probability of being clear;

when an overload condition is reached within said cell, selecting from said clear list an RF channel having said highest probability of being clear; and associating said selected clear list RF channel to said DFA radio, at which point said at least one DFA radio is capable of servicing a call on said selected clear list RF channel.

2. The method of claim 1 wherein said scanning further comprises scanning said RF channel for a predetermined period of time to determine whether said RF channel remains clear throughout said predetermined period of time.

3. The method of claim 1 further comprising:

prior to said associating, scanning said selected clear list RF channel to determine whether said selected clear list RF channel is currently clear; and if said selected clear list RF channel is not currently clear, selecting the next RF channel from said clear list.

4. The method of claim 1 wherein said creating, scanning, and calculating are performed while said at least one DFA radio is in a scanning mode.

5. The method of claim 4 wherein said constructing is performed while said at least one DFA radio is in said scanning mode and said selecting and associating are performed while said at least one DFA radio is in a selection mode.

6. The method of claim 5 further comprising:

when said cell exits said overload condition, handing off said call from said at least one DFA radio to a fixed radio of said cell; and returning said at least one DFA radio to said scanning mode.

7. The method of claim 1 further comprising:

monitoring said selected clear list RF channel to which said at least one DFA radio is associated for interference during a call; and responsive to detection of interference, determining whether there is another radio within said cell available to service said call and, if so, handing said call off to said other radio.

8. A method of allocating radio frequency ("RF") channels in an RF communications network including a cell comprising at least one dynamic frequency association ("DFA") radio, the method comprising:

creating a scan list comprising a list of RF channels potentially available for use by said at least one DFA radio for servicing calls;

for each of said RF channels in said scan list, scanning said RF channel using said at least one DFA radio to determine whether said RF channel is clear; and for each of said RF channels in said scan list, calculating a probability of being clear for said RF channel based on current and previous scans of said RF channel;

wherein, when a scan reveals said RF channel to be clear, said probability of being clear for said RF channel is calculated using the following equation:

$$P_i = P_{i-1} * \left(\frac{N_i}{N_i + 1}\right)^x + \left(1 - \left(\frac{N_i}{N_i + 1}\right)^x\right)$$

where $P_i$ represents the probability of being clear of the RF channel at scan i, $N_i$ represents the scan iteration, and x is a variable exponent.

9. A method of allocating radio frequency ("RF") channels in an RF communications network including a cell comprising at least one dynamic frequency association ("DFA") radio, the method comprising:

creating a scan list comprising a list of RF channels potentially available for use by said at least one DFA radio for servicing calls;

for each of said RF channels in said scan list, scanning said RF channel using said at least one DFA radio to determine whether said RF channel is clear; and for each of said RF channels in said scan list, calculating a probability of being clear for said RF channel based on current and previous scans of said RF channel;

wherein, when a scan reveals said RF channel not to be clear, said probability of being clear for said RF channel is calculated using the following equation:

$$P_i = P_{i-1} * \left(\frac{N_i}{N_i + 1}\right)$$

where $P_i$ represents the probability of being clear of the RF channel at scan i, and $N_i$ represents the scan iteration.

10. A system for allocating radio frequency ("RF") channels in an RF communications network including a cell during a low traffic period of said cell, said cell comprising at least one dynamic frequency association ("DFA") radio, the system comprising:

means for creating a scan list comprising a list of RF channels potentially available for use by said at least one DFA radio for servicing calls;

means for scanning each of said RF channels in said scan list using said at least one DFA radio to determine whether said channel is clear;

means for calculating a probability of being clear for each of said RF channels in said scan list, based on current and previous scans of said RF channel;

means for constructing a clear list comprising an ordered list of each of said RF channels of said scan list determined to have at least a predetermined minimum probability of being clear, said clear list RF channels being arranged in order from a highest to a lowest probability of being clear;

means for selecting from said clear list an RF channel having said highest probability of being clear when an overload condition is reached within said cell; and means for associating said selected clear list RF channel to said DFA radio, at which point said at least one DFA radio is capable of servicing a call on said selected clear list RF channel.

11. The system of claim 10 wherein said means for scanning further comprises means for scanning said RF channel for a predetermined period of time to determine whether said RF channel remains clear throughout said predetermined period of time.

12. The system of claim 10 further comprising:

means for scanning said selected clear list RF channel to determine whether said selected clear list RF channel is currently clear prior to said associating; and means for selecting the next RF channel from said clear list if said selected clear list RF channel is not currently clear.

13. The system of claim 10 wherein said creating, scanning, and calculating are performed while said at least one DFA radio is in a scanning mode.

14. The system of claim 13 wherein said constructing is performed while said DFA radio is in said scanning mode and said selecting and associating are performed while said at least one DFA radio is in a selection mode.

15. The system of claim 14 further comprising:

means for handing off said call from said at least one DFA radio to a fixed radio of said cell when said cell exits said overload condition; and means for returning said at least one DFA radio to said scanning mode.

16. The system of claim 10 further comprising:

means for monitoring said selected clear list RF channel to which said at least one DFA radio is associated for interference during a call; and means responsive to detection of interference for determining whether there is another radio within said cell available to service said call and, if so, handing said call off to said other radio.

17. A system for allocating radio frequency ("RF") channels in an RF communications network including a cell comprising at least one dynamic frequency association ("DFA") radio, the system comprising:

means for creating a scan list comprising a list of RF channels potentially available for use by said at least one DFA radio for servicing calls;

means for scanning each of said RF channels in said scan list using said at least one DFA radio to determine whether said RF channel is clear; and means for calculating a probability of being clear for each of said RF channels in said scan list, based on current and previous scans of said RF channel;

wherein, when a scan reveals said RF channel to be clear, said probability of being clear for said RF channel is calculated using the following equation:

$$P_i = P_{i-1} * \left(\frac{N_i}{N_i + 1}\right)^x + \left(1 - \left(\frac{N_i}{N_i + 1}\right)^x\right)$$

where $P_i$ represents the probability of being clear of the RF channel at scan i, $N_i$ represents the scan iteration, and x is a variable exponent.

18. A system for allocating radio frequency ("RF") channels in an RF communications network including a cell comprising at least one dynamic frequency association ("DFA") radio, the system comprising:

means for creating a scan list comprising a list of RF channels potentially available for use by said at least one DFA radio for servicing calls;

means for scanning each of said RF channels in said scan list using said at least one DFA radio to determine whether said RF channel is clear; and means for calculating a probability of being clear for each of said RF channels in said scan list, based on current and previous scans of said RF channel;

wherein, when a scan reveals said RF channel not to be clear, said probability of being clear for said RF channel is calculated using the following equation:

$$P_i = P_{i-1} * \left(\frac{N_i}{N_i + 1}\right)$$

where $P_i$ represents the probability of being clear of the RF channel at scan i, and $N_i$ represents the scan iteration.

19. A radio frequency ("RF") communications network comprising:

a mobile switching center ("MSC");

a base station controller ("BSC") electrically connected to said MSC;

a cell having a base station connected to said BSC; and a dynamic frequency association ("DFA") radio connected to said BSC;

wherein, during a low traffic period of said cell, said DFA radio operates in a scanning mode in which said DFA radio:

creates a scan list comprising a list of RF channels potentially available for use by said DFA radio for servicing calls;

for each of said RF channels in said scan list, scans said RF channel to determine whether said RF channel is clear;

for each of said RF channels in said scan list, calculates a probability of being clear for said RF channel based on current and previous scans of said RF channel; and constructs a clear list comprising an ordered list of each of said RF channels of said scan list determined to have at least a predetermined minimum probability of being clear, said clear list RF channels being arranged in order from a highest to a lowest probability of being clear; and wherein, when an overload condition is reached within said cell, said DFA radio operates in a selection mode in which said DFA radio:

selects from said clear list an RF channel having said highest probability of being clear; and associates said selected clear list RF channel to said DFA radio, at which point said DFA radio is capable of servicing a call on said selected clear list RF channel.

20. The network of claim 19 wherein said DFA radio scans said RF channel for a predetermined period of time to determine whether said RF channel remains clear throughout said predetermined period of time.

21. The network of claim 19 wherein said DFA radio:

scans said selected clear list RF channel to determine whether said selected clear list RF channel is currently clear prior to said associating; and selecting the next RF channel from said clear list if said selected clear list RF channel is not currently clear.

22. The network of claim 19 wherein when said cell exits said overload condition, said call is handed off from said DFA radio to a fixed radio of said cell and said DFA radio is returned to said scanning mode.

23. The network of claim 19 wherein said DFA radio further monitors said selected clear list RF channel to which said DFA radio is associated for interference during a call, and responsive to detection of interference, determines whether there is another radio within said cell available to service said call and, if so, hands said call off to said other radio.

24. The network of claim 19, wherein, when a scan reveals said RF channel to be clear, said probability of being clear for said RF channel is calculated using the following equation:

$$P_i = P_{i-1} * \left(\frac{N_i}{N_i + 1}\right)^x + \left(1 - \left(\frac{N_i}{N_i + 1}\right)^x\right)$$

where $P_i$ represents the probability of being clear of the RF channel at scan i, $N_i$ represents the scan iteration, and x is a variable exponent.

25. The network of claim 19, wherein, when a scan reveals said RF channel not to be clear, said probability of being clear for said RF channel is calculated using the following equation:

$$P_i = P_{i-1} * \left(\frac{N_i}{N_i + 1}\right)$$

where $P_i$ represents the probability of being clear of the RF channel at scan i, and $N_i$ represents the scan iteration.

26. The network of claim 19 wherein, during said scanning mode, said DFA radio constructs a clear list comprising an ordered list of each of said RF channels of said scan list determined to have at least a predetermined minimum probability of being clear, said clear list RF channels being arranged in order from a highest to a lowest probability of being clear.

27. A method of allocating radio frequency ("RF") channels in an RF communications network including a cell comprising a base station which includes at least one dynamic frequency association ("DFA") radio, the method comprising:
   creating a scan list comprising a list of RF channels potentially available for use by said at least one DFA radio for servicing calls;
   for each of said RF channels in said scan list, scanning said RF channel using said at least one DFA radio to determine whether said RF channel is clear;
   for each of said RF channels in said scan list, calculating a probability of being clear for said RF channel based on current and previous scans of said RF channel by said base station.

28. The method of claim 27 further comprising:
   constructing a clear list comprising an ordered list of each of said RF channels of said scan list determined to have at least a predetermined minimum probability of being clear, said clear list RF channels being arranged in order from a highest to a lowest probability of being clear;
   when an overload condition is reached within said cell, selecting from said clear list an RF channel having said highest probability of being clear; and
   associating said selected clear list RF channel to said DFA radio, at which point said at least one DFA radio is capable of servicing a call on said selected clear list RF channel.

29. The method of claim 28 further comprising:
   prior to said associating, scanning said selected clear list RF channel to determine whether said selected clear list RF channel is currently clear; and
   if said selected clear list RF channel is not currently clear, selecting the next RF channel from said clear list.

30. The method of claim 29 further comprising:
   monitoring said selected clear list RF channel to which said at least one DFA radio is associated for interference during a call; and
   responsive to detection of interference, determining whether there is another radio within said cell available to service said call and, if so, handing said call off to said other radio.

31. A system for allocating radio frequency ("RF") channels in an RF communications network including a cell comprising a base station which includes at least one dynamic frequency association ("DFA") radio, the system comprising:
   means for creating a scan list comprising a list of RF channels potentially available for use by said at least one DFA radio for servicing calls;
   means for scanning each of said RF channels in said scan list using said at least one DFA radio to determine whether said RF channel is clear;
   means for calculating a probability of being clear for each of said RF channels in said scan list, based on current and previous scans of said RF channel by said at least one DFA radio of said base station.

32. The system of claim 31 further comprising:
   means for constructing a clear list comprising an ordered list of each of said RF channels of said scan list determined to have at least a predetermined minimum probability of being clear, said clear list RF channels being arranged in order from a highest to a lowest probability of being clear;
   means for selecting from said clear list an RF channel having said highest probability of being clear when an overload condition is reached within said cell; and
   means for associating said selected clear list RF channel to said DFA radio, at which point said at least one DFA radio is capable of servicing a call on said selected clear list RF channel.

33. The system of claim 32 further comprising:
   means for scanning said selected clear list RF channel to determine whether said selected clear list RF channel is currently clear prior to said associating; and
   means for selecting the next RF channel from said clear list if said selected clear list RF channel is not currently clear.

34. The system of claim 33 further comprising:
   means for handing off said call from said at least one DFA radio to a fixed radio of said cell when said cell exits said overload condition; and
   means for returning said at least one DFA radio to said scanning mode.

35. The system of claim 34 further comprising:
   means for monitoring said selected clear list RF channel to which said at least one DFA radio is associated for interference during a call; and
   means responsive to detection of interference for determining whether there is another radio within said cell available to service said call and, if so, handling said call off to said other radio.

* * * * *

UNITED STATES PATENT AND TRADEMARK OFFICE
CERTIFICATE OF CORRECTION

PATENT NO. : 6,219,554 B1
DATED : April 17, 2001
INVENTOR(S) : Eswara et al.

It is certified that error appears in the above-identified patent and that said Letters Patent is hereby corrected as shown below:

<u>Title page,</u>
Item [57], ABSTRACT, line 1, replace "techniques" with -- technique --

<u>Column 1,</u>
Line 22, replace "in" with -- is --.
Line 58, replace "generally" with -- general --

<u>Column 2,</u>
Line 5, replace "Carriers" with -- Carrier --
Line 62, replace "predefine" with -- predefined --

<u>Column 3,</u>
Line 21, replace "is" with -- if --

<u>Column 4,</u>
Line 32, replace "Cell" with -- Call --

<u>Column 6,</u>
Line 43, replace "of the" with -- of --

<u>Column 7,</u>
Line 21, replace "is" with -- if --

<u>Column 8,</u>
Line 57, replace "turned" with -- tuned --
Line 59, replace "penetrating" with -- performing --

<u>Column 9,</u>
Line 12, replace "communication" with -- communications --

<u>Column 10,</u>
Line 35, replace "cells" with -- calls --

<u>Column 12,</u>
Line 66, replace "selecting" with -- selects --

UNITED STATES PATENT AND TRADEMARK OFFICE
CERTIFICATE OF CORRECTION

PATENT NO. : 6,219,554 B1
DATED : April 17, 2001
INVENTOR(S) : Eswara et al.

It is certified that error appears in the above-identified patent and that said Letters Patent is hereby corrected as shown below:

Column 14,
Line 64, replace "handling" with -- handing --

Signed and Sealed this

Second Day of April, 2002

*Attest:*

*Attesting Officer*

JAMES E. ROGAN
*Director of the United States Patent and Trademark Office*